United States Patent Office 3,502,947
Patented Mar. 24, 1970

3,502,947
ELECTROLYTIC CAPACITOR AND NOVEL ELECTROLYTE
John E. Hand, Sanford, N.C., assignor to Sangamo Electric Company, Springfield, Ill., a corporation of Delaware
No Drawing. Filed Jan. 23, 1967, Ser. No. 610,790
Int. Cl. H01g 9/00
U.S. Cl. 317—230          9 Claims

ABSTRACT OF THE DISCLOSURE

A substantially anhydrous electrolytic composition comprised of a heteropoly acid such as phosphotungstic acid dissolved in an organic solvent and neutralized to a pH of 7.7, the composition being useful as the impregnant for the spacer of an aluminum capacitor to impart stable characteristics and long operating and shelf life thereto.

---

This invention relates to electrolytic capacitors and particularly to a novel electrolyte therefor.

An important object of the invention is to provide an electrolyte which in solution form is useful for impregnating the spacer of an electrolytic capacitor so as to produce a capacitor having long life and stable characteristics when stored and/or operated at high as well as low temperatures.

Thus it is known that both the capacity and dissipation factor of capacitors employing conventional electrolytes change with changes in temperature. However, contrary to expectations I have found that an electrolyte of improved characteristics can be produced by dissolving a heteropoly acid such as phosphotungstic acid in a suitable organic solvent such as N,N-dimethylformamide and bringing the solution to an essentially neutral condition, as for example by adding ammonia gas until a pH of 7.7 is reached.

By substituting such an electrolyte for more conventional electrolytes, I have found that I am able to produce a capacitor which is less subject to its environment and chemical deterioration through prolonged use.

Thus it is a feature of the invention that by using the disclosed electrolyte in electrolytic capacitors having aluminum anodes and cathodes, I am able to produce capacitors which are extremely stable through an operating range of −55 to +125° C. and capacitors which are capable of operating at temperatures above 150° C. over sustained periods of time.

A further feature of the invention is that an electrolyte is provided which when incorporated in electrolytic capacitor produces one capable of long shelf life and in which capacitance and direct current leakage does not materially change with age whether stored or operated over long sustained periods of time.

Thus it is a further feature of my invention that I am able to provide an electrolyte which is useful to impregnate the paper spacer of an aluminum type capacitor so as to produce an extremely stable electrolytic capacitor and one having electrical characteristics comparable to that of more expensive tantalum foil capacitors.

Whereas it is known that the direct current leakage of capacitors made with conventional electrolytes is very high, particularly when the capacitors are stored at elevated temperatures, it is a feature of this invention that capacitors are produced using the disclosed electrolyte which have long shelf life and only a low leakage current when stored within an environment of elevated temperature.

A further feature of capacitors employing the herein disclosed electrolyte is that the rate of anode oxide deterioration which occurs in the capacitor during operation or storage at high temperatures remains very low.

Still another feature of the invention and/or advantage thereof is that the electrolyte is conveniently and readily prepared and has a chemical composition which is easily controlled.

Many other features and advantages and/or objects of the invention will be apparent at once, or will become so from the more detailed description of the invention which follows.

As noted above the present invention contemplates an electrolyte of novel composition which may be used with a capacitor of conventional construction, for example one employing an aluminum foil anode and an aluminum foil cathode which are separated by a paper spacer and after being wound into a cylindrical shape are sealed within an appropriate container. Such an electrolyte may be characterized as consisting of a heteropoly acid dissolved within a substantially anhydrous organic solvent, the composition being brought to an essentially neutral pH by the addition of a suitable agent such as ammonia gas, triethylamine, diethylamine or monoethanolamine. N,N-dimethylformamide is the solvent of choice particularly when phosphotungstic acid is the elected heteropoly acid. However, any of the conventional polar organic solvents which are compatible with the elected heteropoly acid may be utilized. Dimethylacetamide is illustrative of another polar organic solvent which is also useful, although somewhat inferior to the previously mentioned N,N-dimethylformamide, which is the preferred solvent.

Although the invention contemplates that any of the heteropoly acids from the sub groups V and VI of the Periodic Table which includes vanadium, niobium, tantalum, chromium, molybdenum and tungsten may be employed, heteropoly acids of the phosphorus group, and more specifically phosphotungstic acid, are preferred. Examples of other heteropoly acids will include phosphomolybdic acid and phosphovanadic acid. These heteropoly acids exist in several forms; for example phosphotungstic acid may be a 9-poly or a 12-poly acid. In my experience to date the 12-poly acid has proved the most useful. Because of its unusual structure, to my knowledge, the heteropoly acids have not been previously used as an electrolyte. My tests, however, indicate that the heteropoly structure of such acids provides a highly conductive, good film-forming and non-gasing electrolyte when dissolved in an appropriate polar organic solvent, this in spite of the fact that they are not considered to be strong electron affinity compounds. The proportion of the heteropoly acid dissolved in the solvent is not crtical. However, I have found that particularly good results are obtained when the heteropoly acid is added to the solvent in approximately thirteen parts by weight.

Because water is unavoidably present in the chemicals employed to form the electrolyte, and moisture is also picked up from the air during preparation of the composition, the electrolyte when initially prepared will contain up to 1.0% water. However, I have found that the most stable capacitors are obtained when the water content is kept low. Thus, in accordance with the invention, before the electrolyte has been forced into the spacer of the electrolytic capacitor I dry the spacer at an elevated temperature to reduce its water content to well below 1% and also heat the acid sufficiently to dry out the acid. In one process heat was applied for two hours at 400° C. Thus I have found that excellent capacitors are produced when the water content has been lowered to 0.467%. Capacitors so further treated in accordance wtih my invention have maximum shelf life and low dissipation factor as well as a long operating life, particularly when operated at temperatures in excess of 150° C.

Illustrative of the invention, capactiors were constructed wherein both the anode and cathode comprised .0035 inch thick etched aluminum plates, the anode having an aluminum oxide coating formed by applying a voltage greater than the operating voltage in a conductive solution such as boric acid solution. The anode and cathode aluminum plates were separated by a thickness of paper and wound around a steel rod which was afterwards removed so as to leave a capacitor section of cylindrical shape. The capacitor sections so formed were then connected by means of aluminum tabs to an aluminum container and rubber insulated header in which they were placed. These sections were then vacuum impregnated with an heteropoly acid electrolyte solution according to the present invention and after drying the capacitors to reduce the water content of the electrolyte, the containers were sealed by spinning the aluminum can onto the header so as to prevent loss of electrolyte.

In these exemplifying capacitors, the electrolyte employed was composed of

N,N-dimethylformamide—100 ml.
Phosphotungstic acid—13 grams (after drying)
Ammonia (gas)—Sufficient to provide a pH of 7.7

It was prepared by adding the phosphotungstic acid to the polar organic solvent, in this instance N,N-dimethylformamide, and while the mixture was stirred, ammonia gas was bubbled into the mixture until a pH of 7.7 was obtained, indicating a neutral or only slightly alkaline state.

The above described capacitors were thereafter subjected to tests for direct current leakage and dissipation factor to determine the extent of chemical deterioration after prolonged storage at elevated temperature and also to determine the combined effect of environment and applied voltage after being operated for prolonged periods of time in an atmosphere of elevated temperature. For example, randomly selected ones of the exemplifying capacitors above described were measured for direct current leakage by charging the capactior with 5 volts D.C. at 25° C. and taking a measurement after three minutes elapse of time. Their capacitance was also measured in microfarads and the dissipation factor measured using an equivalent series resistance bridge, both the capacity and dissipation factor being determined at 120 cycles. In one set of tests, the capacitors were placed in an environment of 125° C. and charged with 5 volts D.C. for a period of time and measured for D.C. leakage, capacity and dissipation factor at the start of the test and at intervals corresponding to 226 hours, 1033 hours and 2040 hours of operation in order to determine the effect of environment and applied voltage on D.C. leakage, capacity and dissipation factor. These tests indicated the following results:

TABLE I.—D.C. LEAKAGE IN MICROAMPS AFTER 3 MINUTES

| Capacitor | At start of test | After 226 hrs. | After 1,033 hrs. | After 2,040 hrs. |
|---|---|---|---|---|
| A | 1.50 | .45 | .37 | .55 |
| B | 1.55 | .45 | .25 | 1.0 |
| C | 1.10 | .55 | .65 | .68 |
| D | 1.55 | 1.10 | .65 | .60 |
| E | 1.40 | .90 | .50 | .67 |
| F | 1.20 | .70 | .45 | .62 |

CAPACITY IN MICROFARADS AT 120 C.p.s.

| A | 378 | 378 | 369 | 366 |
| B | 369 | 373 | 364 | 361 |
| C | 391 | 394 | 391 | 391 |
| D | 403 | 405 | 403 | 401 |
| E | 380 | 388 | 384 | 383 |
| F | 380 | 386 | 385 | 382 |

DISSIPATION FACTOR IN PERCENT AT 120 C.p.s.

| A | 7.5 | 6.8 | 7.0 | 7.3 |
| B | 8.0 | 7.0 | 7.3 | 8.0 |
| C | 8.5 | 7.4 | 7.9 | 8.0 |
| D | 7.0 | 7.2 | 8.1 | 8.2 |
| E | 8.5 | 7.9 | 8.4 | 8.6 |
| F | 8.5 | 7.9 | 8.6 | 8.7 |

Similar tests were conducted on a second group of capacitors to determine the degree of chemical deterioration as a function of environment only. These samples were measured for D.C. leakage, capacity and dissipation factor at the beginning of the tests and after 161 hours, 568 hours and 687 hours in an environment of 125° C. but with no voltage charge on the capacitor.

TABLE II.—D.C. LEAKAGE IN MICROAMPS AFTER 5 MINUTES

| Capacitor | At start | After 161 hrs. | After 568 hrs. | After 687 hrs. |
|---|---|---|---|---|
| G | .83 | 1.10 | 1.45 | .42 |
| H | .87 | 0.60 | 1.70 | .49 |
| I | 1.00 | 0.70 | 1.40 | .52 |
| J | 1.05 | 0.90 | 1.30 | .75 |
| K | 1.00 | 0.85 | 1.40 | .31 |

CAPACITY IN MICROFARADS AT 120 C.p.s.

| G | 384 | 377 | 374 | 377 |
| H | 386 | 380 | 379 | 381 |
| I | 387 | 381 | 379 | 380 |
| J | 394 | 387 | 385 | 387 |
| K | 406 | 396 | 394 | 397 |

DISSIPATION FACTOR PERCENT AT 120 C.p.s.

| G | 6.9 | 7.0 | 7.6 | 7.8 |
| H | 7.8 | 8.0 | 8.5 | 10.5 |
| I | 6.8 | 6.6 | 7.1 | 7.4 |
| J | 6.9 | 6.8 | 6.8 | 7.2 |
| K | 7.7 | 7.6 | 7.7 | 8.1 |

A further group of the capacitors were also tested to determine the effect of reverse current on the electrolyte and the cathodic oxide system. Three of the next group of six capacitors tested had an oxide coating formed on their cathode by ageing the cathodes for 7½ minutes at room temperature, after which 6 volts D.C. were applied thereto for fifteen hours in an environment of 125° C., followed by application of 1 volt D.C. in reverse for 30 minutes, and then a final application of 6 volts in the forward direction for thirty minutes. All six capacitors of this group were measured for D.C. leakage at the start of the run by placing the capacitors in an environment of 25° C., applying 5 volts D.C. and taking a capacitance reading at 3 minutes. Thereafter the capacitors were placed in an environment of 125° C. and with 1 volt D.C. applied to the capacitors in the reverse direction. Measurements for D.C. leakage, capacity and dissipation factor were then taken after 166 hours and 1029 hours. The results were as follows:

TABLE III.—LEAKAGE IN MICROAMPS AFTER 3 MINUTES

| Capacitor | At start | After 166 hrs. | After 1,029 hrs. |
|---|---|---|---|
| L | .95 | 1.03 | .63 |
| M | .85 | .90 | .64 |
| N | 1.20 | 1.25 | .75 |
| O | .65 | .85 | .68 |
| P | .75 | 1.30 | .65 |
| Q | .65 | .85 | .80 |

CAPACITY IN MICROFARADS

| L | 371 | 364 | 364 |
| M | 377 | 366 | 369 |
| N | 386 | 374 | 380 |
| O | 375 | 366 | 371 |
| P | 373 | 365 | 366 |
| Q | 388 | 377 | 376 |

DISSIPATION FACTOR, PERCENT

| L | 12.6 | 12.9 | 15.3 |
| M | 12.8 | 14.1 | 15.4 |
| N | 12.1 | 12.4 | 14.7 |
| O | 12.2 | 12.8 | 15.4 |
| P | 12.4 | 12.6 | 15.4 |
| Q | 12.5 | 13.4 | 15.7 |

From the above description it will be apparent that all the recited objects and features of the invention have been demonstrated.

Thus having described my invention, I claim:

1. An electrolytic capacitor electrolyte consisting essentially of a solute of heteropoly acid of the phosphorus class selected from the group consisting of phosphomolybdic acid, phosphotungstic acid and phosphovanadic acid in a polar organic solvent, the pH of which has been adjusted with ammonia or amine to near neutral or only slightly alkaline state.

2. An electrolytic capacitor electrolyte consisting essentially of a solute of heteropoly acid selected from the group consisting of phosphomolybdic acid, phosphotungstic acid, and phosphovanadic acid in polar organic solvent, the pH of which has been adjusted to near neutral or only slightly alkaline pH with ammonia or amine, said electrolyte having a low water content of less than 1% by weight, being highly conductive and having a stable capacity and dissipation factor at high and low temperatures.

3. An electrolyte for an electrolytic capacitor consisting essentially of a solute of phosphotungstic acid dissolved in a polar organic solvent, the pH of which has been adjusted to a near neutral or slightly alkaline state with ammonia or amine.

4. An electrolyte as claimed in claim 3 wherein the electrolyte contains less than 1% water by weight.

5. An electrolytic capacitor electrolyte consisting essentially of the following approximate proportions:

N,N-dimethylformamide—100 ml.
Phosphotungstic acid—13 grams the pH of which has been adjusted by the addtion of ammonia sufficient to provide pH near 7.7.

6. A capacitor comprising aluminum anode and cathode members separated by an insulating spacer impregnated with an electrolyte as claimed in claim 3 and dried to reduce the water content thereof to substantially below 1% by weight.

7. A capacitor as claimed in claim 6 wherein the water content of the electrolyte approximates .46% by weight.

8. An electrolytic capacitor electrolyte as claimed in claim 3 wherein the organic solvent is selected from the group consisting of N,N-dimethylformamide and dimethylacetamide.

9. An electrolytic capacitor electrolyte as claimed in claim 3 wherein the solute has been neutralized by an ingredient from the group consisting of ammonia, triethylamine, diethylamine and monoethanolamine.

References Cited

Nikitina et al. "Chemical Abstracts" p. 23681a, 1960,
Van Wazer "Phosphorus and its Compounds," vol. I, Interscience Publishers Inc., 1958.

HELEN M. McCARTHY, Primary Examiner

J. COOPER, Assistant Examiner

U.S. Cl. X.R.

252—62.2